(12) United States Patent
Rodriguez Bravo et al.

(10) Patent No.: US 11,599,432 B2
(45) Date of Patent: Mar. 7, 2023

(54) DISTRIBUTED APPLICATION ORCHESTRATION MANAGEMENT IN A HETEROGENEOUS DISTRIBUTED COMPUTING ENVIRONMENT

(71) Applicant: Kyndryl, Inc., New York, NY (US)

(72) Inventors: Cesar Augusto Rodriguez Bravo, San Rafael de Alajuela (CR); David Alonso Campos Batista, Heredia (CR); Ruben Luengas De La Fuente, Madrid (ES); Mauro Marzorati, Lutz, FL (US)

(73) Assignee: Kyndryl, Inc., New York, NY (US)

( * ) Notice: Subject to any disclaimer, the term of this patent is extended or adjusted under 35 U.S.C. 154(b) by 37 days.

(21) Appl. No.: 17/444,930

(22) Filed: Aug. 12, 2021

(65) Prior Publication Data

US 2022/0398173 A1 Dec. 15, 2022

(51) Int. Cl.
*G06F 11/07* (2006.01)
*G06F 11/20* (2006.01)
*G06F 11/14* (2006.01)
*H04L 67/10* (2022.01)

(52) U.S. Cl.
CPC ...... *G06F 11/2023* (2013.01); *G06F 11/1438* (2013.01); *H04L 67/10* (2013.01); *G06F 2201/85* (2013.01)

(58) Field of Classification Search
CPC ............ G06F 11/2023; G06F 11/1438; G06F 2201/85; H04L 67/10
See application file for complete search history.

(56) References Cited

U.S. PATENT DOCUMENTS

| 8,122,282 | B2 | 2/2012 | Betzler et al. |
| 8,332,688 | B1 | 12/2012 | Tompkins |
| 9,317,372 | B1 | 4/2016 | Rousseau et al. |
| 9,527,587 | B2 | 12/2016 | Levien et al. |

(Continued)

OTHER PUBLICATIONS

"Auto-repairing nodes," Kubernetes Engine Documentation, Google Cloud, Accessed Nov. 11, 2020, 4 pages https://cloud.google.com/kubernetes-engine/docs/how-to/node-auto-repair.

(Continued)

*Primary Examiner* — Matthew M Kim
*Assistant Examiner* — Kyle Emanuele
(74) *Attorney, Agent, or Firm* — Yee & Associates, P.C.

(57) ABSTRACT

Distributed application orchestration management is provided. A first passive member of a set of passive members sends a notification message to other members indicating that the first passive member is initiating start of a distributed application in response to the first passive member validating that a self-restart by a leader member failed. The first passive member compares timestamps associated with an attempt to start the distributed application by other passive members in the set of passive members. The first passive member stops a particular attempt to start the distributed application in response to the first passive member determining that a timestamp associated with the particular attempt to start the distributed application by the first passive member is newer than another timestamp of another passive member. The first passive member designates the other passive member having an older timestamp as a new leader member to continue starting the distributed application.

20 Claims, 10 Drawing Sheets

(56) References Cited

U.S. PATENT DOCUMENTS

| | | | |
|---|---|---|---|
| 10,417,102 B2 | 9/2019 | Sanakkayala et al. | |
| 2013/0117231 A1* | 5/2013 | Sridharan | G06F 11/1482 707/639 |
| 2013/0326053 A1 | 12/2013 | Bauer et al. | |
| 2017/0308446 A1 | 10/2017 | Kanso | |
| 2019/0340048 A1* | 11/2019 | Brown | G06F 11/0724 |
| 2020/0042410 A1* | 2/2020 | Gupta | H04L 67/1097 |
| 2020/0099593 A1 | 3/2020 | Sailer et al. | |

OTHER PUBLICATIONS

Vanecek, "Cloud failover technologies," Cloud & Heat Technologies GmbH, Copyright 2011-2020, Feb. 2, 2016, Accessed Nov. 11, 20020, 10 pages. https://www.cloudandheat.com/cloud-failover-technologies/.

"Recover your instance," Amazon Elastic Compute Cloud, Amazon Web Services, Inc. Copyright 2020, Accessed Nov. 11, 2020, 2 pages. https://docs.aws.amazon.com/AWSEC2/latest/UserGuide/ec2-instance-recover.html.

"Setting up health checking and autohealing," Google Cloud, Accessed Nov. 10, 2020, 14 pages. https://cloud.google.com/compute/docs/instance-groups/autohealing-instances-in-migs.

Mell et al., "The NIST Definition of Cloud Computing", Computer Security Division, National Institute of Standards and Technology, Jan. 2011, 7 pages.

"Deploy and Manage Kubernetes Clusters in a Multicloud World," Open Infrastructure Foundation, May 8, 2019, YouTube.com, Accessed Jul. 14, 2021, 3 pages. https://www.youtube.com/watch?v=uBVRflbppB8.

"Multi-cloud CI/CD with failover powered by Kubernetes, Istio, Helm, and Codefresh," Codefresh, Aug. 9, 2019, YouTube.com, Accessed Jul. 14, 2021, 3 pages. https://www.youtube.com/watch?v=ZEjY6AXvOMw.

"Multicloud Security Explained," IBM Cloud, Mar. 11, 2020, YouTube.com, Accessed Aug. 12, 2021, 3 pages. https://www.youtube.com/watch?v=BcV5wHyMhfs.

"What is IBM Cloud Pak for Watson AIOps?," IBM Cloud Pak® for Watson AIOps, IBM Corp, Accessed Aug. 12, 2021, 7 pages. https://www.ibm.com/cloud/cloud-pak-for-watson-aiops.

"Multicloud management platform," IBM Corp, Accessed Aug. 12, 2021, 5 pages. https://www.ibm.com/services/cloud/multicloud/management.

"IBM to Accelerate Hybrid Cloud Growth Strategy and Execute Spin-Off of Market-Leading Managed Infrastructure Services Unit," IBM Corp, Oct. 8, 2020, Accessed Aug. 12, 2021, 5 pages. https://newsroom.ibm.com/2020-10-08-IBM-To-Accelerate-Hybrid-Cloud-Growth-Strategy-And-Execute-Spin-Off-Of-Market-Leading-Managed-Infrastructure-Services-Unit.

Comfort, "How a Hybrid Multicloud Strategy Can Overcome the Cloud Paradox," THINKBlog, IBM Corp, Nov. 5, 2019, Accessed Aug. 12, 2021, 5 pages. https://www.ibm.com/blogs/think/2019/11/how-a-hybrid-multicloud-strategy-can-overcome-the-cloud-paradox/.

* cited by examiner

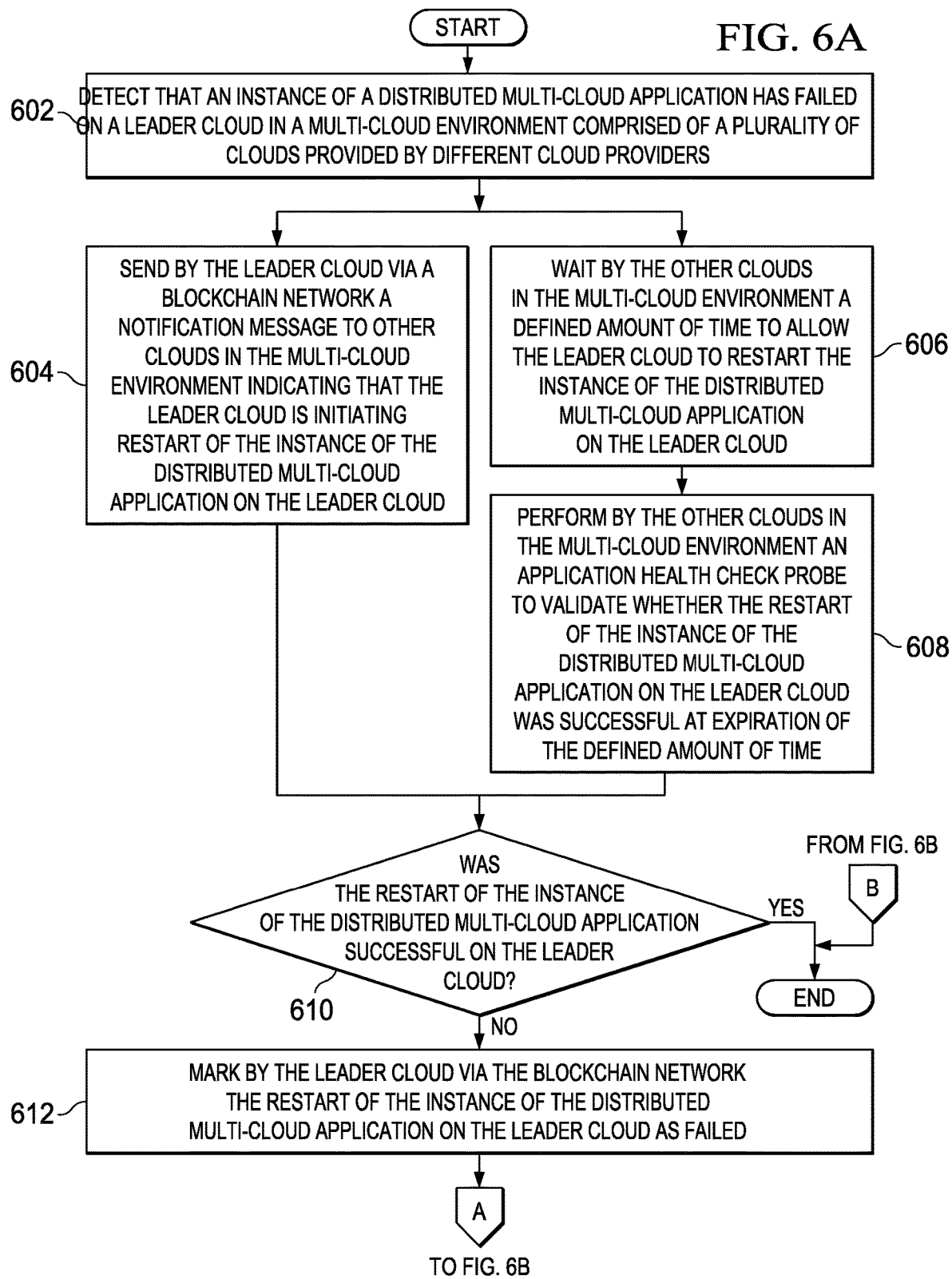

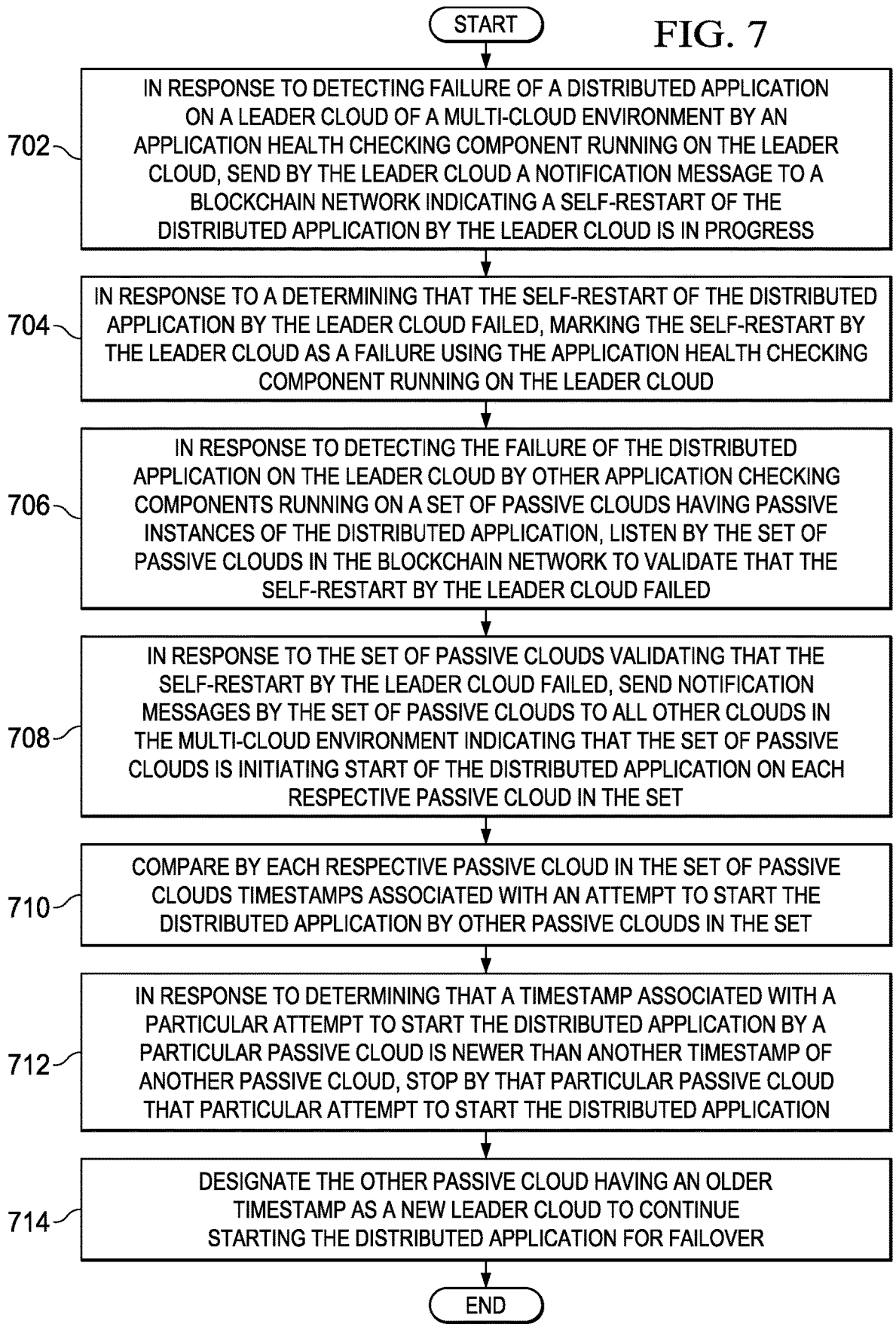

DISTRIBUTED APPLICATION ORCHESTRATION MANAGEMENT IN A HETEROGENEOUS DISTRIBUTED COMPUTING ENVIRONMENT

BACKGROUND

1. Field

The disclosure relates generally to multi-cloud environments and more specifically to utilizing a quorum-based technique to determine which cloud in a multi-cloud environment comprised of a plurality of different clouds managed by a plurality of different cloud providers an instance of a distributed multi-cloud application is to be started on after detecting application failure to achieve a given performance envelope using an inherent consensus building capability of a blockchain network.

2. Description of the Related Art

Multi-cloud is utilization of multiple cloud services, such as, for example, computing, storage, and the like, in a single heterogeneous cloud architecture. Multi-cloud also refers to distribution of resources or assets, such as, for example, software applications, programs, and the like, across multiple cloud-hosting environments. With a typical multi-cloud infrastructure utilizing two or more clouds, such as, for example, public clouds, private clouds, hybrid clouds, or the like, a multi-cloud infrastructure tries to eliminate reliance on any single cloud provider. Multi-cloud differs from hybrid cloud in that multi-cloud refers to multiple cloud services rather than multiple cloud deployment models (e.g., public, private, and hybrid). Also, in a multi-cloud infrastructure, synchronization between different providers is not essential to complete processing or a transaction. For example, an entity, such as, for example, an enterprise, company, business, organization, institution, agency, or the like, may concurrently use different cloud providers for infrastructure, platform, and software services. Similarly, an entity may utilize different cloud providers for different workloads or may deploy a single workload load balanced across multiple providers.

A blockchain exists as a shared and continuously reconciled database. The distribution and reconciliation of the database can be done automatically, by time, by some internal or extrinsic event, or by other criteria. In each case, a blockchain is a continuously growing chain of data blocks, which are linked and secured using cryptography. Each block typically contains a cryptographic hash of the previous block in the blockchain, as well as a timestamp and data corresponding to an event, such as an operational event, transaction, or the like. The cryptographic hash of the previous block in the blockchain, links the two blocks. The linked blocks form the blockchain. Blocks are appended in chronological order. In other words, the last block in the chain is the most recent block. Further, blocks are immutable (i.e., cannot be changed or deleted).

By design, a blockchain is resistant to modification of the data. For use as a distributed, decentralized ledger (i.e., not stored in just one central network node), a blockchain is typically managed by a network of members collectively adhering to a protocol for validating new blocks. Each member connected to, or connecting to, the network receives a copy of the blockchain, which is downloaded automatically. Once recorded, the data in any given block cannot be altered retroactively without the alteration of all subsequent blocks. Thus, decentralized consensus is achieved using a blockchain.

SUMMARY

According to one illustrative embodiment, a computer-implemented method for distributed application orchestration management is provided. A first passive member of a set of passive members sends a notification message to other members in a heterogeneous distributed computing environment indicating that the first passive member is initiating start of a distributed application on the first passive member in response to the first passive member validating that a self-restart by a leader member failed. The first passive member compares timestamps associated with an attempt to start the distributed application by other passive members in the set of passive members. The first passive member stops a particular attempt to start the distributed application in response to the first passive member determining that a timestamp associated with the particular attempt to start the distributed application by the first passive member is newer than another timestamp of another passive member. The first passive member designates the other passive member having an older timestamp as a new leader member to continue starting the distributed application for failover. According to other illustrative embodiments, a computer system and computer program product for distributed application orchestration management are provided.

BRIEF DESCRIPTION OF THE DRAWINGS

FIGS. 6A-6B are a flowchart illustrating a process for selecting a cloud in a multi-cloud environment to start an instance of a distributed multi-cloud application upon detection of application failure in accordance with an illustrative embodiment;

FIG. 7 is a flowchart illustrating a process for managing failover of a distributed multi-cloud application in a multi-cloud environment in accordance with an illustrative embodiment.

DETAILED DESCRIPTION

Figure 1:
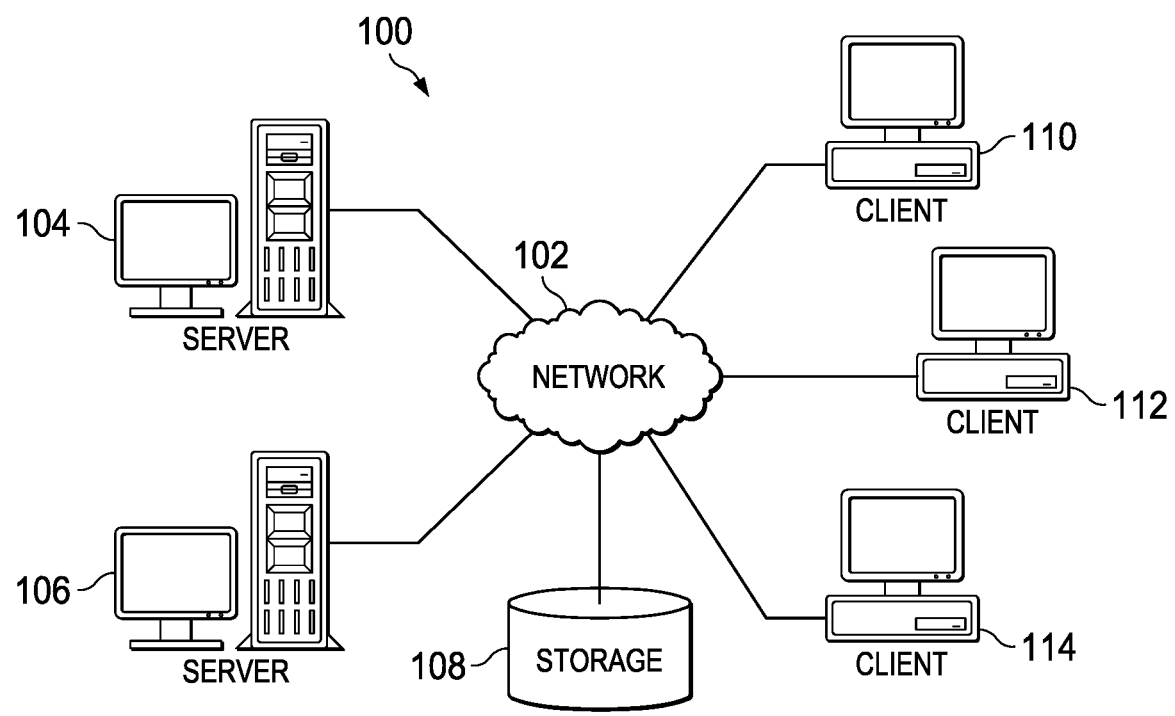
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in a heterogeneous distributed computing environment, such as, for example, a multi-cloud computing environment comprised of a plurality of different cloud types managed by a plurality of different cloud providers. Moreover, server 104 and server 106 may be members of a blockchain network.

In addition, server 104 and server 106 may provide one or more online services, such as, for example, financial services, banking services, governmental services, educational services, healthcare services, insurance services, data services, and the like, which correspond to one or more entities, to users of client devices. The one or more entities may include, for example, enterprises, businesses, companies, organizations, institutions, agencies, or the like. Further, server 104 and server 106 may provide orchestration management services for distributed applications, such as, for example, distributed multi-cloud applications, in the heterogeneous distributed computing environment. Server 104 and server 106 provide the distributed application orchestration management services by utilizing a quorum-based technique to determine which computing member (e.g., cloud) within the heterogeneous distributed computing environment (e.g., multi-cloud environment) an instance of the distributed application is to be started on after detecting application failure to achieve a given performance and availability envelope using a blockchain network.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like, with wire or wireless communication links to network 102. Users of clients 110, 112, and 114 may utilize clients 110, 112, and 114 to access and utilize the online services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers comprising the heterogeneous distributed computing environment, identifiers and network addresses for a plurality of client devices, identifiers for a plurality of client device users, and the like. Furthermore, storage 108 may store other types of data, such as authentication or credential data that may include usernames, passwords, and the like associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
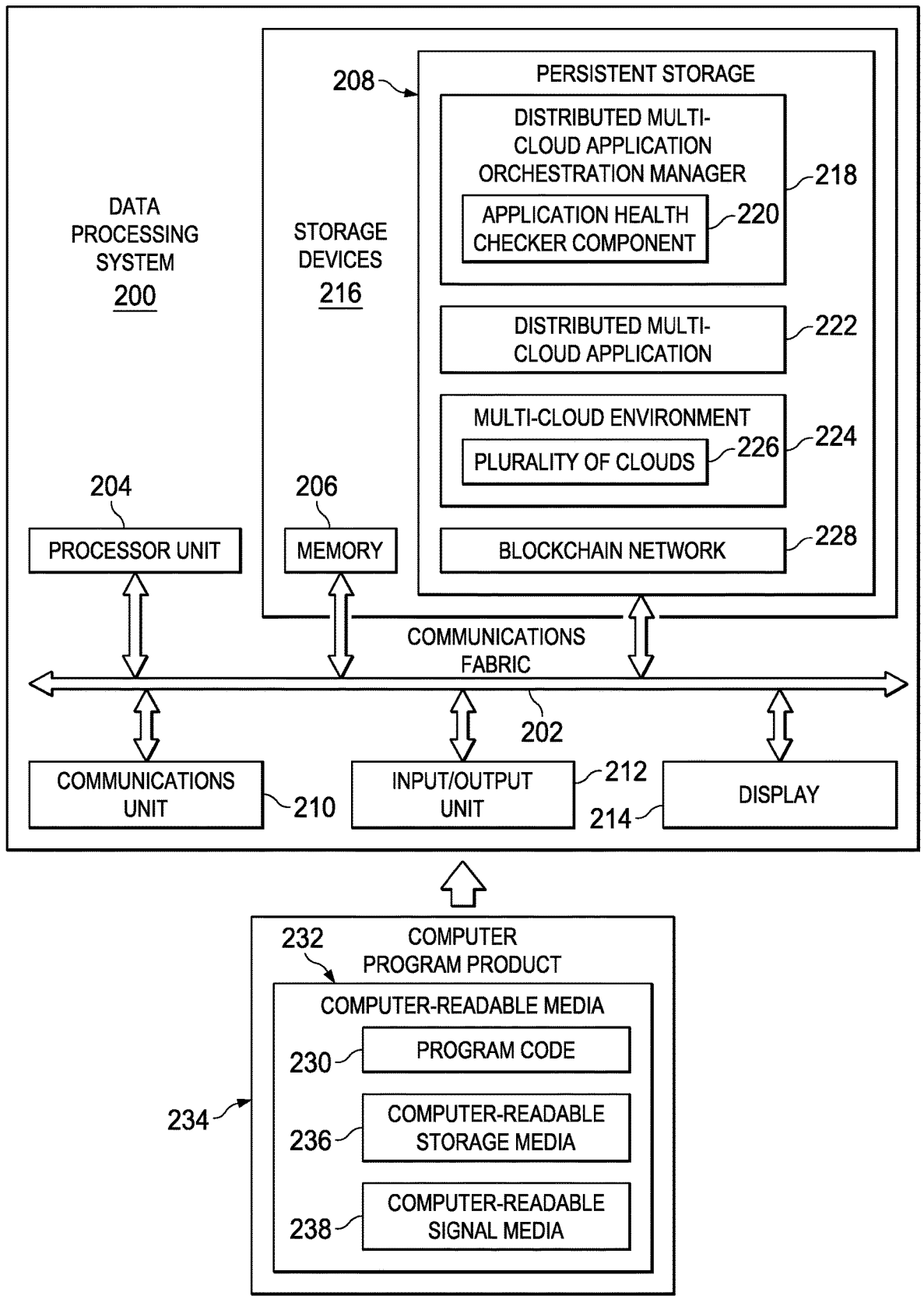
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or server 106 in FIG. 1, in which computer-readable program code or instructions implementing the distributed multi-cloud application orchestration management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores distributed multi-cloud application orchestration manager 218. However, it should be noted that even though distributed multi-cloud application orchestration manager 218 is illustrated as residing in persistent storage 208, in an alternative illustrative embodiment, distributed multi-cloud application orchestration manager 218 may be a separate component of data processing system 200. For example, distributed multi-cloud application orchestration manager 218 may be a hardware component coupled to communication fabric 202 or a combination of hardware and software components.

Distributed multi-cloud application orchestration manager 218 is one of a plurality of distributed multi-cloud application orchestration managers, which are located in a plurality of other data processing systems located in plurality of clouds 226 comprising multi-cloud environment 224, that work together to determine which cloud in plurality of clouds 226 an instance of distributed multi-cloud application 222 should be started on after detecting application failure to achieve a given performance envelope using blockchain network 228. It should be noted that multi-cloud environment 224 represents an identifier of a particular multi-cloud environment where data processing system 200 is located. Also, plurality of clouds 226 represents identifiers for a plurality of different clouds located within multi-cloud environment 224. In addition, data processing system 200 is located within one cloud of plurality of clouds 226.

Distributed multi-cloud application orchestration manager 218 includes application health checker component 220. Distributed multi-cloud application orchestration manager 218 utilizes application health checker component 220 to perform application health check probes on distributed multi-cloud application 222, which is hosted by data processing system 200, and on other instances of distributed multi-cloud application 222, which are hosted by the plurality of other data processing systems located in plurality of clouds 226, to determine a status (e.g., active, passive, or failed) of each instance of distributed multi-cloud application 222 on a predetermined time interval basis. Distributed multi-cloud application 222 may represent any type of distributed multi-cloud application that is capable of performing a set of online services to requesting client device users via a network.

In response to application health checker component 220 detecting a failure of distributed multi-cloud application 222, distributed multi-cloud application orchestration manager 218 tries to automatically restart distributed multi-cloud application 222 on data processing system 200 within a predefined time period. If distributed multi-cloud application orchestration manager 218 is unsuccessful in restarting distributed multi-cloud application 222 on data processing system 200 within the predefined time period, then the plurality of distributed multi-cloud application orchestration managers located in the plurality of other data processing systems within plurality of clouds 226 determine which cloud in plurality of clouds 226 another instance of distributed multi-cloud application 222 is to start based on comparing timestamps, which correspond to when a respective cloud initiated start of a corresponding instance of distributed multi-cloud application 222, in blockchain network 228.

As a result, data processing system 200 operates as a special purpose computer system in which distributed multi-cloud application orchestration manager 218 in data processing system 200 enables management of multiple instances of a distributed multi-cloud application across a multi-cloud environment comprised of different clouds provided by different cloud providers. In particular, distributed multi-cloud application orchestration manager 218 transforms data processing system 200 into a special purpose computer system as compared to currently available general computer systems that do not have distributed multi-cloud application orchestration manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 230 is located in a functional form on computer-readable media 232 that is selectively removable and may be loaded onto or transferred to data processing system 200 for running by processor unit 204. Program code 230 and computer-readable media 232 form computer program product 234. In one example, computer-readable media 232 may be computer-readable storage media 236 or computer-readable signal media 238.

In these illustrative examples, computer-readable storage media 236 is a physical or tangible storage device used to store program code 230 rather than a medium that propagates or transmits program code 230. Computer-readable storage media 236 may include, for example, an optical or magnetic disc that is inserted or placed into a drive or other device that is part of persistent storage 208 for transfer onto a storage device, such as a hard drive, that is part of persistent storage 208. Computer-readable storage media 236 also may take the form of a persistent storage, such as a hard drive, a thumb drive, or a flash memory that is connected to data processing system 200.

Alternatively, program code 230 may be transferred to data processing system 200 using computer-readable signal media 238. Computer-readable signal media 238 may be, for example, a propagated data signal containing program code 230. For example, computer-readable signal media 238 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 232" can be singular or plural. For example, program code 230 can be located in computer-readable media 232 in the form of a single storage device or system. In another example, program code 230 can be located in computer-readable media 232 that is distributed in multiple data processing systems. In other words, some instructions in program code 230 can be located in one data processing system while other instructions in program code 230 can be located in one or more other data processing systems. For example, a portion of program code 230 can be located in computer-readable media 232 in a server computer while another portion of program code 230 can be located in computer-readable media 232 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 230.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
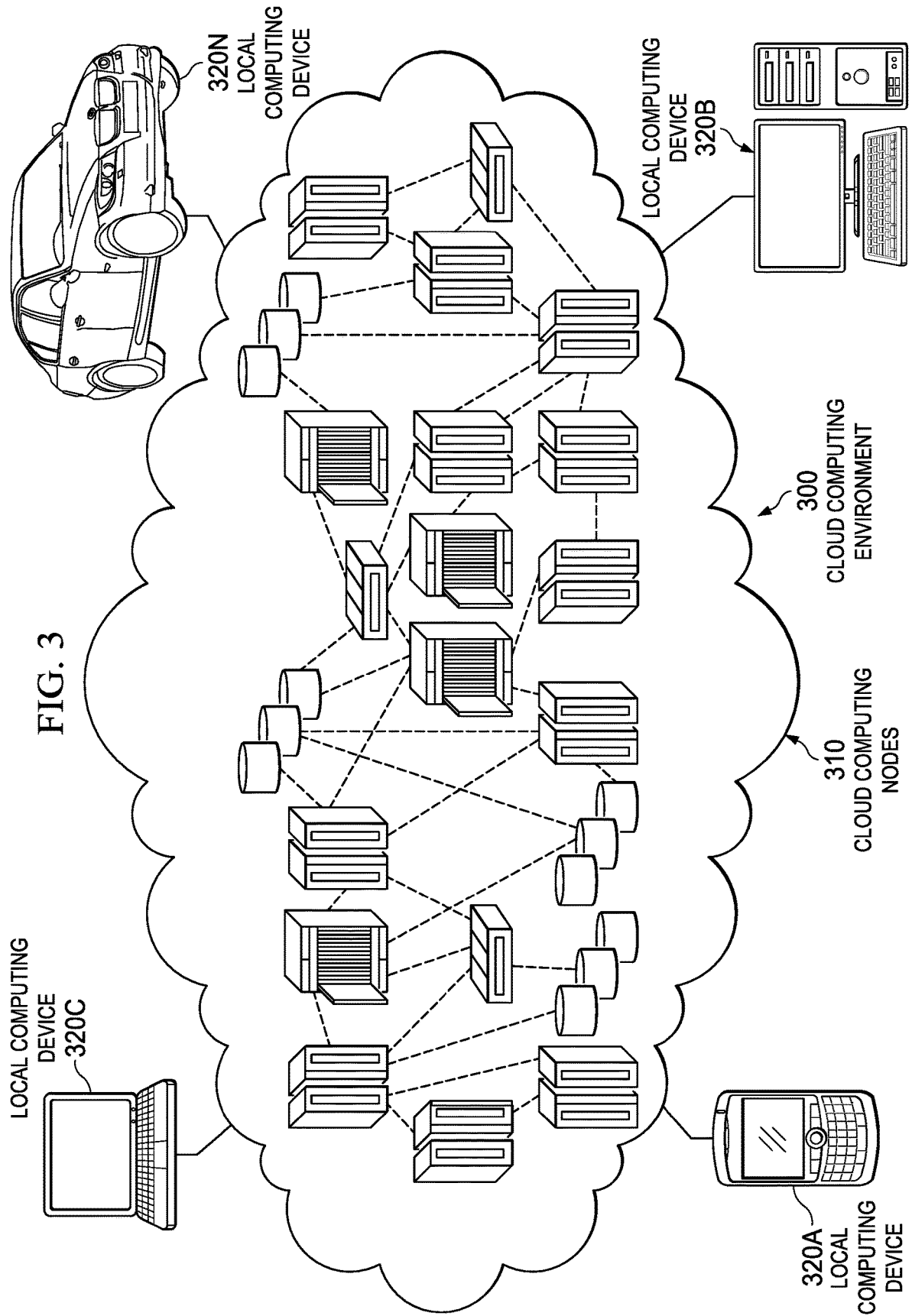
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
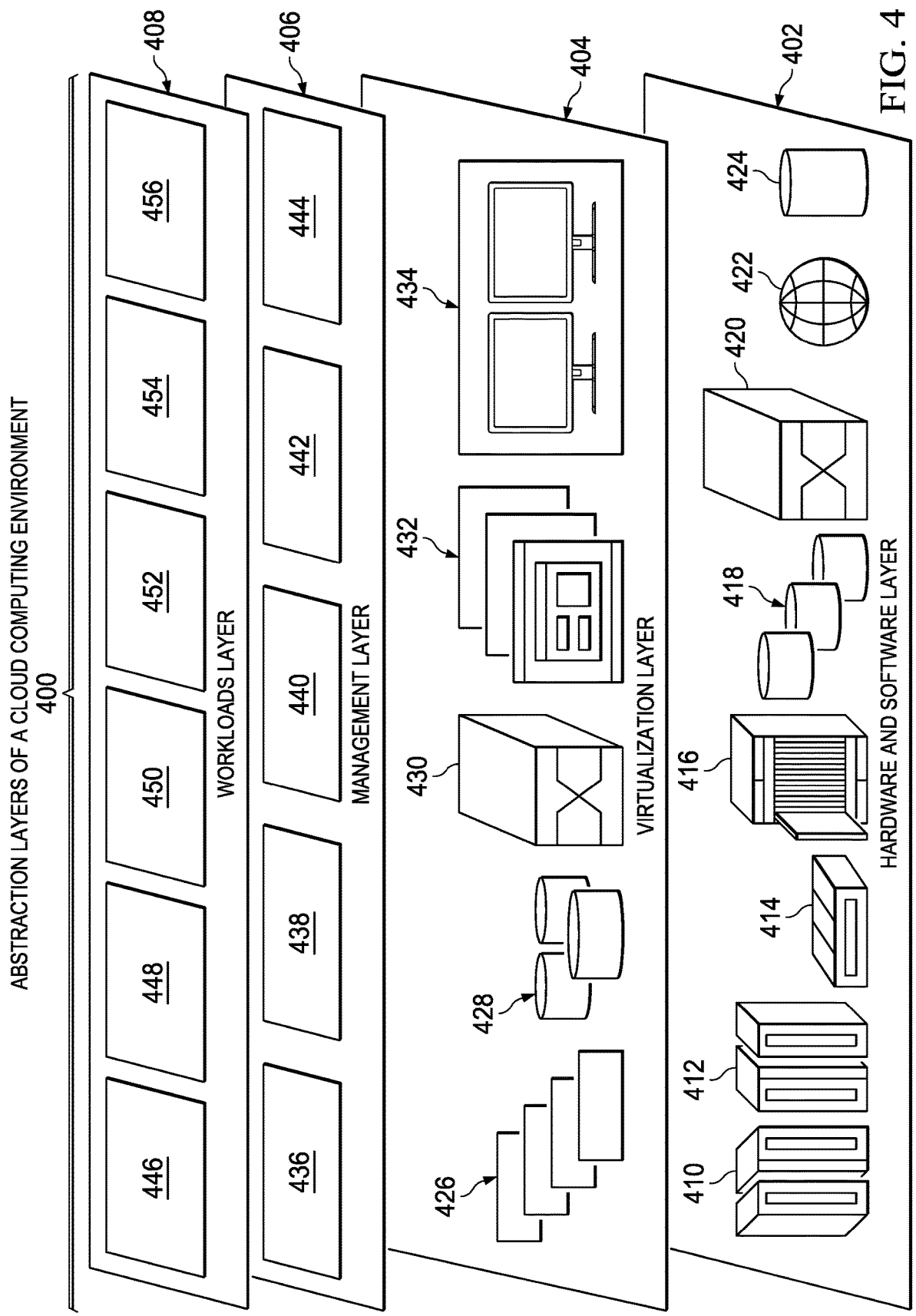
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and distributed multi-cloud application orchestration management 456.

Illustrative embodiments provide a capability to identify, generate, and establish a quorum around contingency actions that a plurality of loosely coupled computing members (e.g., clouds) corresponding to a distributed multi-cloud application may perform so the distributed multi-cloud application may be executed locally in a coordinated manner in the event of an application failure. In other words, illustrative embodiments implement a quorum-based technique to enforce consistent operation in a distributed computing environment, such as, for example, a multi-cloud environment, infrastructure, or architecture. Continually generated contingency plans vary over time with regard to the appropriateness of a given action as situations evolve. Illustrative embodiments ensure that the latest contingency plan is distributed and agreed-upon by computing members corresponding to the distributed multi-cloud application using a blockchain network so that cohesion is maintained while reacting to an external stimulus (e.g., an application failure).

A multi-cloud deployment of a distributed multi-cloud application is one in which the risk of distributed processing is spread across a plurality of clouds provided by different cloud providers that is not bound by anything other than the construct of the distributed multi-cloud application, itself. Given the looseness of the bindings of the application instances that make up the distributed multi-cloud application, keeping track of the health status of each application instance becomes a challenge.

Current solutions that rely on establishing and keeping quorum are highly centralized, with these current solutions centered around exercising control over a single resource, such as, for example, a disk, a network label, or the like, to avoid a split-brain issue. Split-brain may occur when, for example, all communication links go down simultaneously, but a cluster of servers is still running, each server believing it is the only server running. Each server may then randomly serve clients with its own data updates, without any coordination with the other servers. This may lead to data corruption or other data inconsistencies.

Illustrative embodiments provide a way to control behavior of the individual instances of an application that is distributed across the multi-cloud environment (i.e., a heterogeneous distributed computing environment). Illustrative embodiments utilize a quorum-based technique for a distributed multi-cloud application to determine which cloud in a multi-cloud environment the distributed multi-cloud application should start to achieve a given performance envelope (e.g., guaranteed amount of availability, meet specified response times, and other defined performance characteristics) by leveraging the inherent consensus building capability of a blockchain network. The blockchain network guarantees transactional consistency for status changes and provides security identification of members of the blockchain network.

An entity, such as, for example, an enterprise, business, company, organization, institution, agency, or the like, may be running a distributed application on different types of clouds such as a private cloud and a public cloud, on different physical locations in different geographic areas (e.g., different continents, countries, regions, states, or the like), on a plurality of clouds provided by different cloud providers, or the like. In these situations, upon detection of application failure, illustrative embodiments determine which cloud the distributed application is to be restarted on or determine where to add new instances of the application.

To achieve these determinations, illustrative embodiments utilize a quorum of failover contingency actions for distributed multi-cloud applications to determine the best cloud to become the new leader cloud based on real time data received from a decentralized blockchain network. These failover contingency actions represent a ranked hierarchy of preferred actions at a current point in time (i.e., time of the application failure). Illustrative embodiments utilize the blockchain network to record status (e.g., active, passive, or failed) of respective application instances across available clouds in the multi-cloud environment, as well as a timestamp of when each particular cloud in the multi-cloud environment performs a failover contingency action. Automatically restarting an application instance without requiring administrative intervention is known as failover.

Each cloud member of the blockchain network performs application health status checks on the leader cloud in the multi-cloud environment. When other cloud members of the blockchain network in the multi-cloud environment detect application failure on the leader cloud and the leader cloud is not able to self-recover the failed application, the other cloud members of the blockchain network try to start the application and will use blockchain timestamps to elect a new leader cloud. For example, in case of application failure in the leader cloud with no chance of self-recovery, if a failover option of starting the application on cloud 1 has a newer timestamp (i.e., more current in time) as compared to an older timestamp (i.e., earlier in time) corresponding to a failover option of starting the application on cloud 2, then illustrative embodiments direct cloud 2 with the older timestamp to start the application and direct cloud 1 to remain in a passive status.

Once illustrative embodiments select the failover option of starting the application on cloud 2 based on cloud 2 having the older timestamp, illustrative embodiments send notifications throughout the blockchain network regarding cloud 2 starting the application. In the situation where another cloud (e.g., cloud X) in the multi-cloud environment also starts the application, but later receives a notification message regarding cloud 2 starting the application first based on the blockchain timestamps, cloud X stops the process of starting the application. In addition, the older blockchain timestamp determines which cloud (e.g., cloud 2) becomes the new leader cloud.

In a scenario where a stateless distributed application is deployed across a plurality of clouds (e.g., 5), which are provided by different cloud providers, but should only be running in a predefined number of the clouds (e.g., 3), illustrative embodiments, upon detection of an application failure, select the cloud in the multi-cloud environment where the application should be started. Illustrative embodiments designate one of the clouds in the multi-cloud environment as the leader cloud. A software component (i.e., an application health checker component) checks the health status of the application on all the clouds that can host the application. When the application health checker component running on the leader cloud detects failure of the application on the leader cloud, the leader cloud sends a notification message to all cloud members of the blockchain network in the multi-cloud environment indicating that a self-restart of the application by the leader cloud is in progress. It should be noted that restarting the application on the leader cloud, which was previously running the application, is desirable to avoid churn from Domain Name System (DNS) reconfiguration and other attendant concerns.

When application health checker components of other clouds in the multi-cloud environment, which are not currently running the application (i.e., passive clouds), detect failure of the application, these other clouds will wait for a defined amount of time listening in the blockchain network to validate whether the leader cloud, itself, is restarting the application. In response to receiving an application restart notification message from the leader cloud via the blockchain network, these other clouds verify that the application restart notification message is valid, and if valid, these other clouds wait an additional defined amount of time before their respective application health checker components again check the health status of the application.

If the self-restart of the application fails in the leader cloud, the application health checker component of the leader cloud marks the self-restart as failed in the blockchain network. When an application health checker component of a passive cloud finishes waiting for the self-restart in the leader cloud, the application health checker component of the passive cloud re-validates that the application is down (i.e., failed) in the leader cloud via the blockchain network and sends a notification message to all other cloud members of the blockchain network indicating that the passive cloud is now initiating a process to start the application on the passive cloud (e.g., start application, change DNS configuration, change routing, and the like). Other passive cloud members of the blockchain network wait a predetermined amount of time (e.g., one second, five seconds, ten seconds, thirty seconds, one minute, or any other increment of time) before also initiating a process to start the application.

Because different passive clouds can try to start the application at the same time, the application health checker component of respective passive clouds will check the blockchain network for notification messages from other passive clouds indicating respective attempts to start the application. Each application health checker component of respective passive clouds checks a timestamp of each notification message from each respective passive cloud to challenge its own application start notification message timestamp. For example, if a particular passive cloud initiates application start later than another passive cloud's application start attempt, then that particular passive cloud stops its attempt to start the application. A passive cloud having an older application start notification message (i.e., older timestamp in the blockchain network) will become the new leader cloud.

Thus, illustrative embodiments enable control of the number of clouds where a distributed multi-cloud application may be started based on real time availability of clouds in a multi-cloud environment having a passive instance of a distributed multi-cloud application. In addition, illustrative embodiments are capable of determining the best failover option based on the latest performance and response time from a set of available clouds having a passive instance of the distributed multi-cloud application using the blockchain network. Further, illustrative embodiments enable coordination of loosely tied cloud locations hosting the distributed multi-cloud application. As a result, illustrative embodiments provide a decentralized cloud provider agnostic multi-cloud management failover mechanism that increases performance and availability for distributed multi-cloud applications in multi-cloud environments comprised of a plurality of different clouds provided by a plurality of different cloud providers.

Thus, illustrative embodiments provide one or more technical solutions that overcome a technical problem with managing failover of a distributed multi-cloud application in a multi-cloud environment comprised of a plurality of cloud provided by different cloud providers. As a result, these one or more technical solutions provide a technical effect and practical application in the field of distributed multi-cloud applications and multi-cloud performance.

Figure 5:
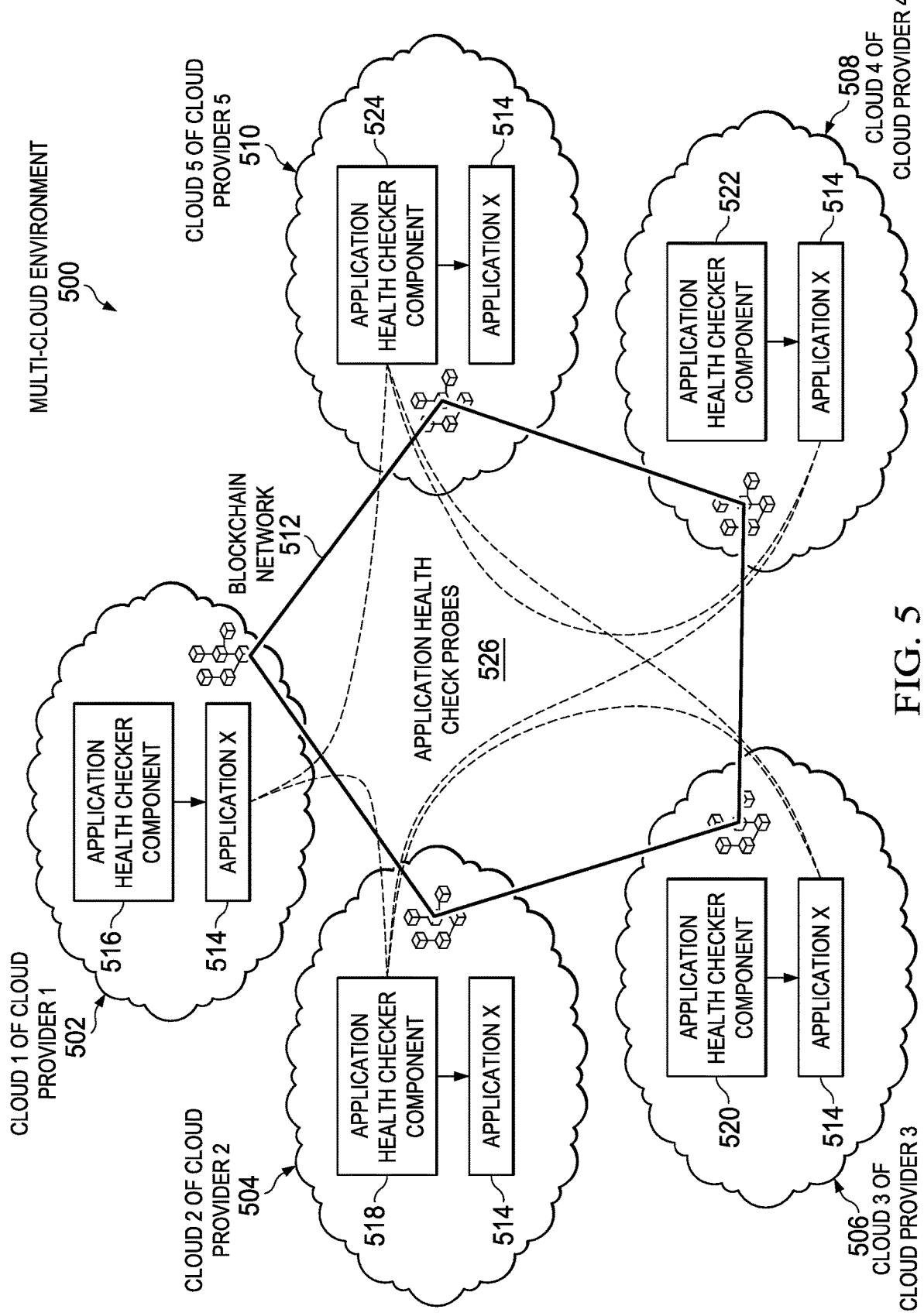
FIG. 5 is a diagram illustrating an example of a multi-cloud environment in accordance with an illustrative embodiment.

With reference now to FIG. 5, a diagram illustrating an example of a multi-cloud environment is depicted in accordance with an illustrative embodiment. Multi-cloud environment 500 may be implemented in a network of data processing systems, such as network data processing system 100 in FIG. 1, or a plurality of cloud computing environments, such as cloud computing environment 300 in FIG. 3. Multi-cloud environment 500 is a system of hardware and software components that utilize a quorum-based technique to determine which cloud in multi-cloud environment 500, which is comprised of a plurality of different clouds managed by a plurality of different cloud providers, an instance of a distributed multi-cloud application should be started on after detecting application failure to achieve a given performance envelope using an inherent consensus building capability of a blockchain network.

In this example, multi-cloud environment 500 is comprised of cloud 1 502 corresponding to cloud provider 1, cloud 2 504 corresponding to cloud provider 2, cloud 3 506 corresponding to cloud provider 3, cloud 4 508 corresponding to cloud provider 4, and cloud 5 510 corresponding to cloud provider 5. However, it should be noted that multi-cloud environment 500 is intended as an example only and not as a limitation on illustrative embodiments. In other words, multi-cloud environment 500 may include any number of clouds provided by any number of different cloud providers.

Further, cloud 1 502, cloud 2 504, cloud 3 506, cloud 4 508, and cloud 5 510 may represent any type of cloud and any combination of different cloud types. Furthermore, cloud 1 502, cloud 2 504, cloud 3 506, cloud 4 508, and cloud 5 510 are members of blockchain network 512. Moreover, each of cloud 1 502, cloud 2 504, cloud 3 506, cloud 4 508, and cloud 5 510 includes an instance of application X 514. Application X 514 is a distributed multi-cloud application that provides an online service to requesting client devices, such as clients 110-114 in FIG. 1. Application X 514 may represent any type of distributed application that can provide any type of online service, such as, for example, a transactional service, educational service, banking service, financial service, healthcare service, governmental service, entertainment service, data service, or the like, corresponding to an entity, such as, for example, an enterprise, business, company, organization, agency, institution, or the like.

In addition, cloud 1 502, cloud 2 504, cloud 3 506, cloud 4 508, and cloud 5 510 also include application health checker component 516, application health checker component 518, application health checker component 520, application health checker component 522, and application health checker component 524, respectively. Each of application health checker component 516, application health checker component 518, application health checker component 520, application health checker component 522, and application health checker component 524 performs application health check probes 526 at predefined time intervals on the multiple instances of application X 514 located in multi-cloud environment 500.

In this example, cloud 1 502 is designed as the leader cloud in blockchain network 512. Also, application X 514 is up and running (i.e., an active application instance) in 3 of the clouds (e.g., cloud 1 502, cloud 3 506, and cloud 4 508) of multi-cloud environment 500 and is passive (i.e., an inactive application instance) in the 2 remaining clouds (e.g., cloud 2 504 and cloud 5 510) of multi-cloud environment 500. In other words, multiple instances of application X 514 are running at the same time in a specified number of clouds within in multi-cloud environment 500.

Assume that application X 514 fails and goes down on cloud 1 502 (i.e., the leader cloud). Application health checker component 516 of cloud 1 502 detects that application X 514 failed on cloud 1 502 while performing application health check probes 526. In addition, application health checker component 518 of cloud 2 504, application health checker component 520 of cloud 3 506, application health checker component 522 of cloud 4 508, and application health checker component 524 of cloud 5 510 also detect that application X 514 failed on cloud 1 502 while performing their respective application health check probes 526.

In response to detecting that application X 514 failed on cloud 1 502, application health checker component 518 of cloud 2 504, application health checker component 520 of cloud 3 506, application health checker component 522 of cloud 4 508, and application health checker component 524 of cloud 5 510 wait for a defined amount of time prior to rechecking the health status of application X 514 on cloud 1 502. Waiting this defined amount of time to recheck the health status of application X 514 on cloud 1 502, allows cloud 1 502 an opportunity to apply self-recovery measures (i.e., time to restart application X 514).

Cloud 1 502 initiates a process to restart application X 514 on cloud 1 502. If cloud 1 502 is able to restart application X 514 and provide service availability before expiration of the defined amount of time, then no further action is taken. If cloud 1 502 is not able to restart application X 514 after expiration of the defined amount of time, then cloud 2 504 and cloud 5 510, which have passive or inactive instances of application X 514, initiate a process to start application X 514 on cloud 2 504 and cloud 5 510, respectively, when application health checker component 516 of cloud 2 504 and application health checker component 524 of cloud 5 510 detect that application X 514 is still down on cloud 1 502.

Cloud 2 504 initiates start of application X 514 on cloud 2 504 at timestamp 0 and sends a notification message to blockchain network 512 regarding initiation of application start at time 0. Cloud 5 510 initiates start of application X 514 on cloud 5 510 at timestamp 0+1 (e.g., a predetermined amount of time, such as 1 second, after timestamp 0) and sends a notification message to blockchain network 512 regarding initiation of application start at time 0+1. In response to cloud 5 510 receiving a notification message via blockchain chain 512 regarding cloud 2 504's attempt to start application X 514 at timestamp 0, which is prior to cloud 5 510's attempt to start application X 514 at timestamp 0+1, cloud 5 510 suspends starting application X 514 and waits an additional predetermined amount of time to allow cloud 2 504 an opportunity to start application X 514 on cloud 2 504.

In response to cloud 2 504 receiving a notification message via blockchain network 512 regarding cloud 5 510's attempt to start application X 514 at timestamp 0+1, cloud 2 504 performs a comparison of its application start time (i.e., timestamp 0) with the application start time of cloud 5 510 (i.e., timestamp 0+1). Because cloud 2 504 initiated start of application X 514 prior to cloud 5 514 based on the comparison of the two blockchain timestamps, cloud 2 504 continues with the process of starting application X 514 on cloud 2 504. If cloud 2 504 is able to start application X 514 successfully within the additional predetermined amount of time, then cloud 2 504 sends another notification message to blockchain network 512 regarding the successful start of application X 514 on cloud 2 504. Further, cloud 2 504 is designed in blockchain network 512 as the new leader cloud for application X 514. In response to cloud 5 510 receiving the notification message via blockchain network 512 regarding the successful start of application X 514 on cloud 2 504 prior to expiration of the additional predetermined amount of time, cloud 5 510 stops its attempt to start application X 514 on cloud 5 510.

Figure 6B:
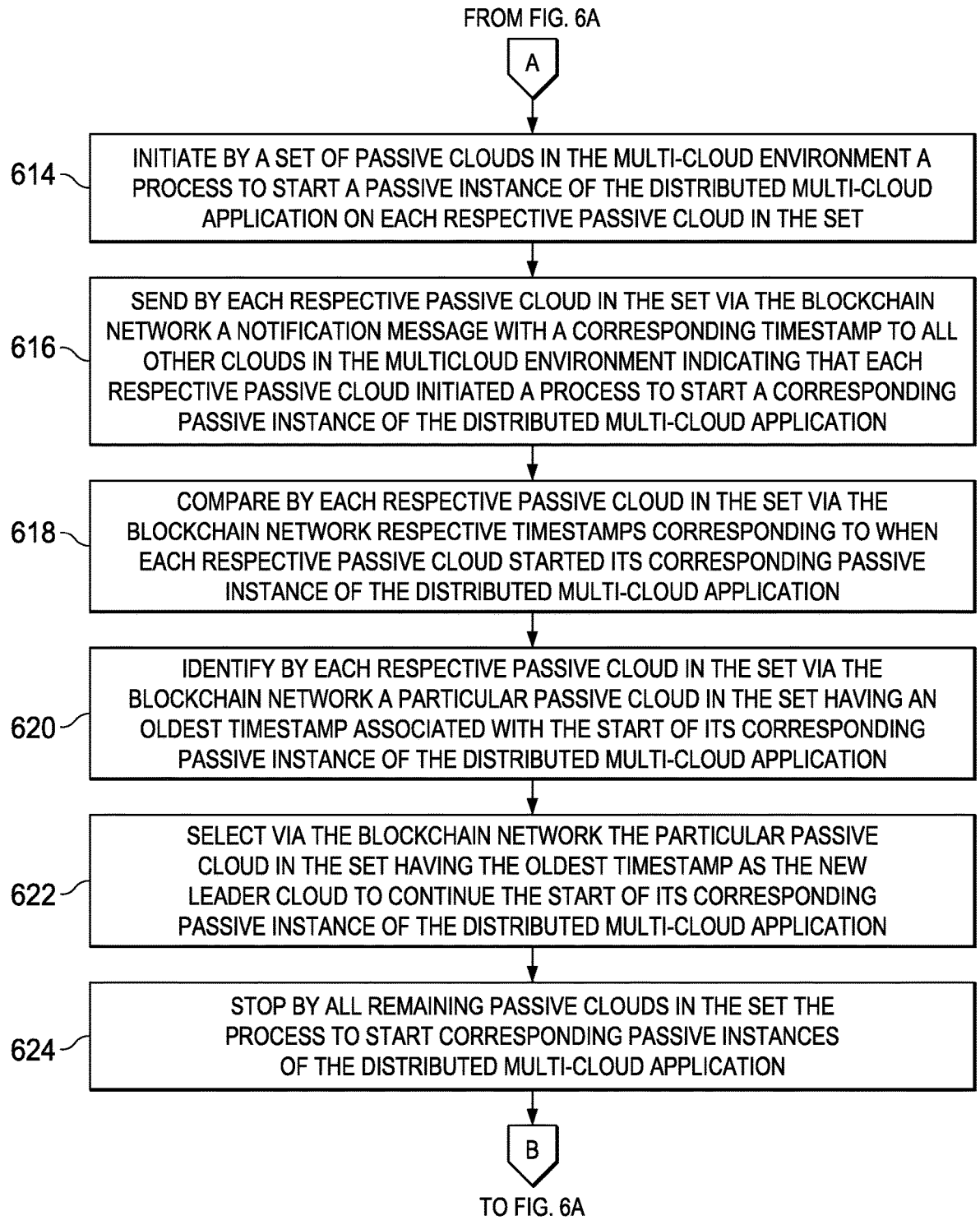

With reference now to FIGS. 6A-6B, a flowchart illustrating a process for selecting a cloud in a multi-cloud environment to start an instance of a distributed multi-cloud application upon detection of application failure is shown in accordance with an illustrative embodiment. The process shown in FIGS. 6A-6B may be implemented in a plurality of clouds comprising a multi-cloud environment, such as, for example, cloud 1 502, cloud 2 504, cloud 3 506, cloud 4 508, and cloud 5 510 comprising multi-cloud environment 500 in FIG. 5.

The process begins when the plurality of clouds detects that an instance of a distributed multi-cloud application has failed on a leader cloud in the multi-cloud environment comprised of the plurality of clouds provided by different cloud providers (step 602). The leader cloud, via a blockchain network, sends a notification message to other clouds in the multi-cloud environment indicating that the leader cloud is initiating restart of the instance of the distributed multi-cloud application on the leader cloud (step 604).

The other clouds in the multi-cloud environment wait a defined amount of time to allow the leader cloud to restart the instance of the distributed multi-cloud application on the leader cloud (step 606). The other clouds in the multi-cloud environment perform an application health check probe to validate whether to the restart of the instance of the distributed multi-cloud application on the leader cloud was successful at expiration of the defined amount of time (step 608).

The leader cloud makes a determination as to whether the restart of the instance of the distributed multi-cloud application was successful on the leader cloud (step 610). If the leader cloud determines that the restart of the instance of the distributed multi-cloud application was successful on the leader cloud, yes output of step 610, then the process terminates thereafter. If the leader cloud determines that the restart of the instance of the distributed multi-cloud application was unsuccessful on the leader cloud, no output of step 610, then the leader cloud, via the blockchain network, marks the restart of the instance of the distributed multi-cloud application on the leader cloud as failed (step 612).

Further, a set of passive clouds in the multi-cloud environment initiates a process to start a passive instance of the distributed multi-cloud application on each respective passive cloud in the set (step 614). Furthermore, each respective passive cloud in the set sends, via the blockchain network, a notification message with a corresponding timestamp to all other clouds in the multi-cloud environment indicating that each respective passive cloud initiated a process to start a corresponding passive instance of the distributed multi-cloud application (step 616). Moreover, each respective passive cloud in the set compares, via the blockchain network, respective timestamps corresponding to when each respective passive cloud started its corresponding passive instance of the distributed multi-cloud application (step 618).

Afterward, each respective passive cloud in the set identifies, via the blockchain network, a particular passive cloud in the set having an oldest timestamp associated with the start of its corresponding passive instance of the distributed multi-cloud application based on comparison of the respective timestamps by each respective passive cloud (step 620). In addition, each respective passive cloud in the set designates, via the blockchain network, the particular passive cloud in the set having the oldest timestamp as the new leader cloud to continue the start of its corresponding passive instance of the distributed multi-cloud application (step 622). All remaining passive clouds in the set stop the process to start corresponding passive instances of the distributed multi-cloud application (step 624). Thereafter, the process terminates.

With reference now to FIG. 7, a flowchart illustrating a process for managing failover of a distributed multi-cloud application in a multi-cloud environment is shown in accordance with an illustrative embodiment. The process shown in FIG. 7 may be implemented in a plurality of clouds comprising a multi-cloud environment, such as, for example, cloud 1 502, cloud 2 504, cloud 3 506, cloud 4 508, and cloud 5 510 comprising multi-cloud environment 500 in FIG. 5.

The process begins when, in response to detecting failure of a distributed application on a leader cloud of a multi-cloud environment by an application health checking component running on the leader cloud, the leader cloud sends a notification message to a blockchain network indicating a self-restart of the distributed application by the leader cloud is in progress (step 702). In response to determining that the self-restart of the distributed application by the leader cloud failed, the leader cloud marks the self-restart as a failure using the application health checking component running on the leader cloud (step 704).

In response to detecting the failure of the distributed application on the leader cloud by other application checking components running on a set of passive clouds having passive instances of the distributed application, the set of passive clouds listen in the blockchain network to validate that the self-restart by the leader cloud failed (step 706). In response to the set of passive clouds validating that the self-restart by the leader cloud failed, the set of passive clouds sends notification messages to all other clouds in the multi-cloud environment indicating that the set of passive clouds is initiating start of the distributed application on each respective passive cloud in the set (step 708).

Each respective passive cloud in the set of passive clouds compares timestamps associated with an attempt to start the distributed application by other passive clouds in the set (step 710). In response to a particular passive cloud determining that a timestamp associated with a particular attempt to start the distributed application by that particular passive cloud is newer than another timestamp of another passive cloud, that particular passive cloud stops that particular attempt to start the distributed application (step 712). That particular passive cloud also designates the other passive cloud having an older timestamp as a new leader cloud to continue starting the distributed application for failover (step 714). Thereafter, the process terminates.

Figure 8A:
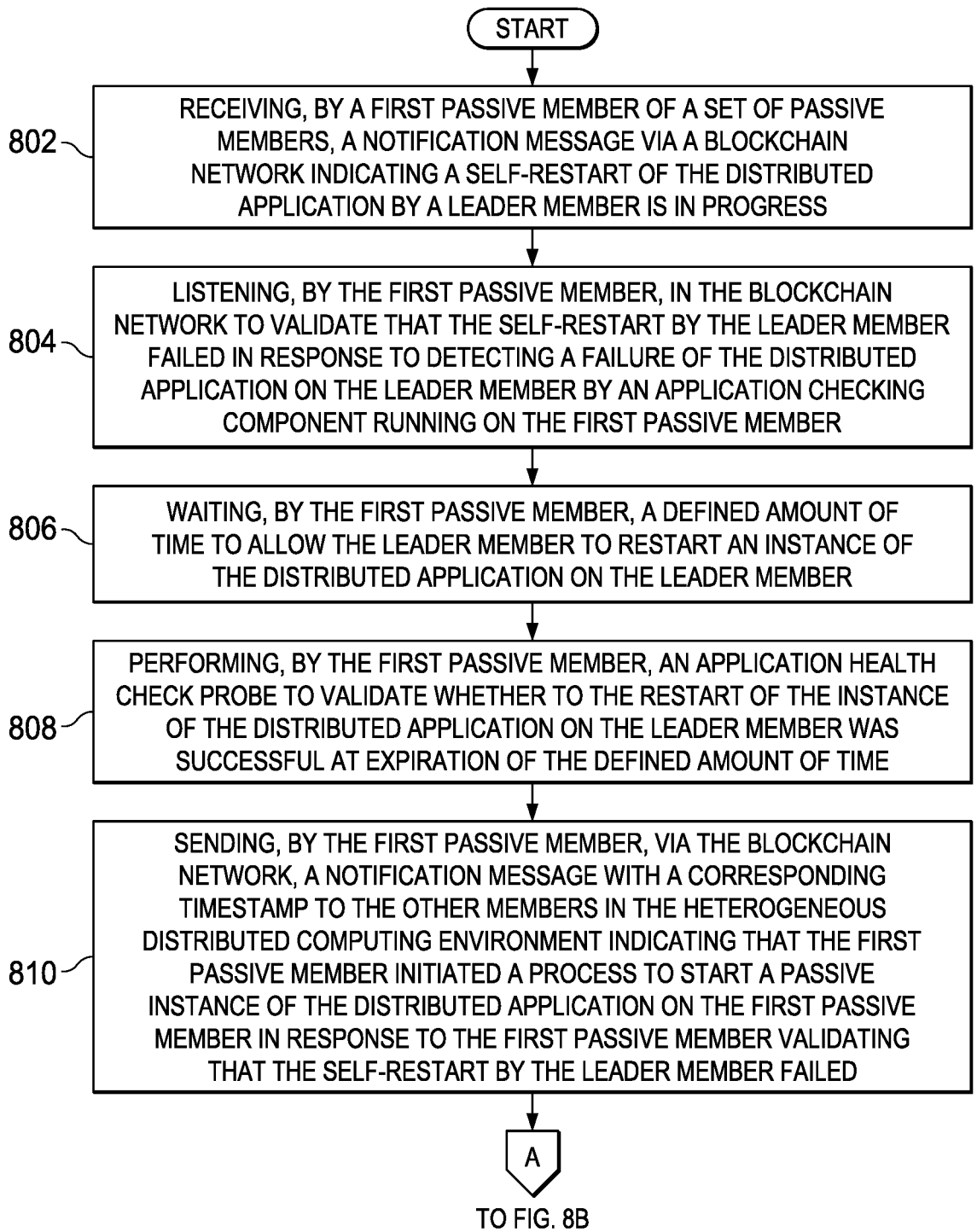
FIGS. 8A-8B are a flowchart illustrating a process for selecting a passive member in as set of passive members to start a passive instance of a distributed application in accordance with an illustrative embodiment.
Figure 8B:
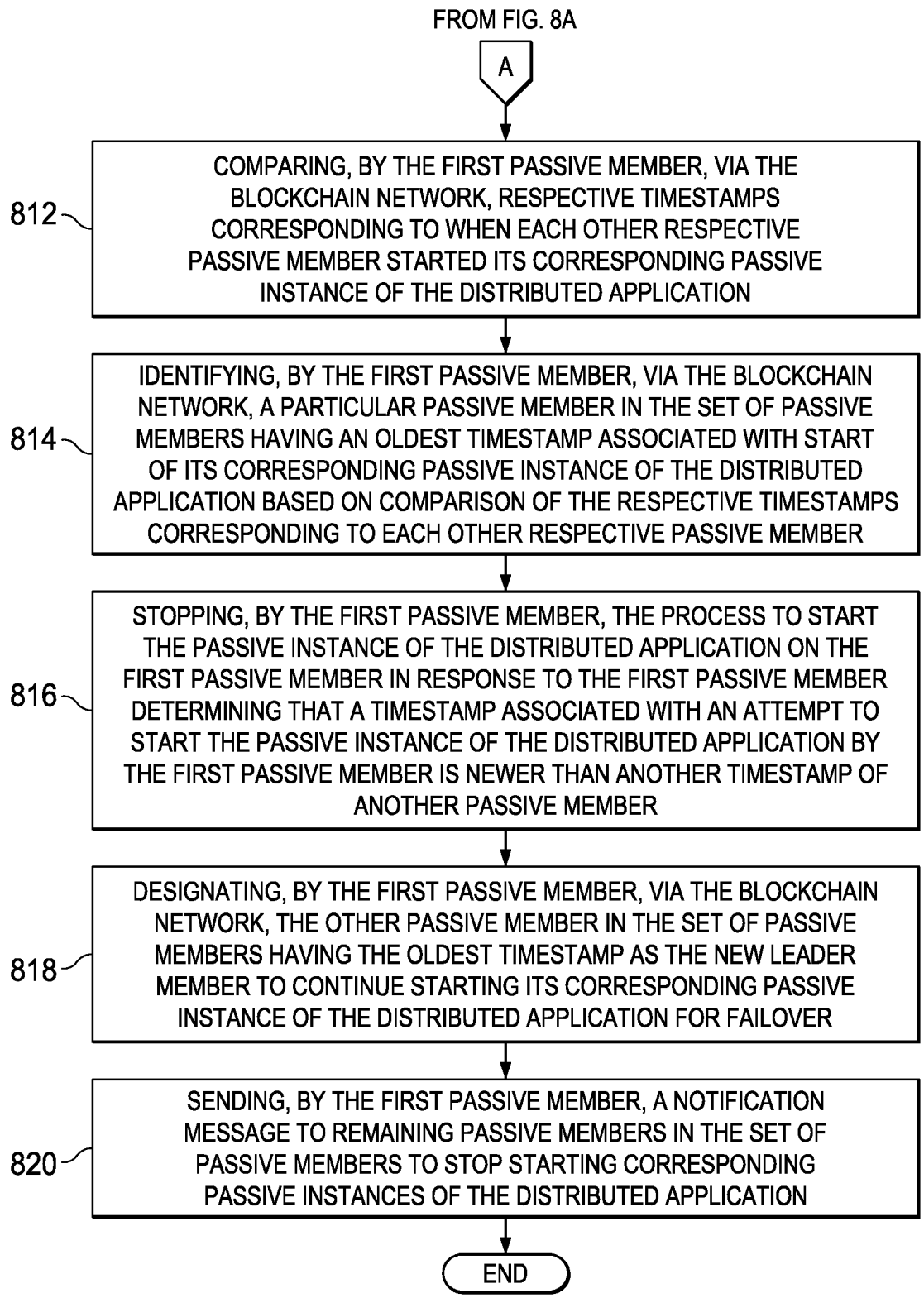

With reference now to FIGS. 8A-8B, a flowchart illustrating a process for selecting a passive member in as set of passive members to start a passive instance of a distributed application is shown in accordance with an illustrative embodiment. The process shown in FIGS. 8A-8B may be implemented in a distributed multi-cloud application orchestration manager, such as, for example, distributed multi-cloud application orchestration manager 218 in FIG. 2.

The process begins when a first passive member of a set of passive members receives a notification message via a blockchain network indicating a self-restart of the distributed application by a leader member is in progress (step 802). The first passive member listens in the blockchain network to validate that the self-restart by the leader member failed in response to detecting a failure of the distributed application on the leader member by an application checking component running on the first passive member (step 804). The first passive member waits a defined amount of time to allow the leader member to restart an instance of the distributed application on the leader member (step 806).

The first passive member performs an application health check probe to validate whether the restart of the instance of the distributed application on the leader member was successful at expiration of the defined amount of time (step 808). The first passive member sends, via the blockchain network, a notification message with a corresponding timestamp to the other members in the heterogeneous distributed computing environment indicating that the first passive member initiated a process to start a passive instance of the distributed application on the first passive member in response to the first passive member validating that the self-restart by the leader member failed (step 810).

The first passive member compares, via the blockchain network, respective timestamps corresponding to when each other respective passive member started its corresponding passive instance of the distributed application (step 812). The first passive member identifies, via the blockchain network, a particular passive member in the set of passive members having an oldest timestamp associated with start of its corresponding passive instance of the distributed application based on comparison of the respective timestamps corresponding to each other respective passive member (step 814). The first passive member stops the process to start the passive instance of the distributed application on the first passive member in response to the first passive member determining that a timestamp associated with an attempt to start the passive instance of the distributed application by the first passive member is newer than another timestamp of another passive member (step 816).

The first passive member designates, via the blockchain network, the other passive member in the set of passive members having the oldest timestamp as the new leader member to continue starting its corresponding passive instance of the distributed application for failover (step 818). The first passive member sends a notification message to remaining passive members in the set of passive members to stop starting corresponding passive instances of the distributed application (step 820). Thereafter, the process terminates.

Thus, illustrative embodiments of the present invention provide a computer-implemented method, computer system, and computer program product for utilizing a quorum-based technique to determine which cloud in a multi-cloud environment comprised of a plurality of different clouds provided by a plurality of different cloud providers an instance of a distributed multi-cloud application should be started on after detecting application failure to achieve a given performance envelope using an inherent consensus building capability of a blockchain network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributed application orchestration management, the computer-implemented method comprising:

sending, by a first passive member of a set of passive members, a notification message to other members in a heterogeneous distributed computing environment indicating that the first passive member is initiating start of a distributed application on the first passive member in response to the first passive member validating that a self-restart by a leader member failed;

comparing, by the first passive member, timestamps associated with an attempt to start the distributed application by other passive members in the set of passive members;

stopping, by the first passive member, a particular attempt to start the distributed application in response to the first passive member determining that a timestamp associated with the particular attempt to start the distributed application by the first passive member is newer than another timestamp of another passive member; and designating, by the first passive member, the other passive member having an older timestamp as a new leader member to continue starting the distributed application for failover.

2. The computer-implemented method of claim 1 further comprising:

receiving, by the first passive member, a notification message via a blockchain network indicating the self-restart of the distributed application by the new leader member is in progress.

3. The computer-implemented method of claim 2 further comprising:

listening, by the first passive member, in the blockchain network to validate that the self-restart by the leader member failed in response to detecting a failure of the distributed application on the leader member by an application checking component running on the first passive member.

4. The computer-implemented method of claim 3 further comprising:

waiting, by the first passive member, a defined amount of time to allow the leader member to restart an instance of the distributed application on the leader member; and performing, by the first passive member, an application health check probe to validate whether to the restart of the instance of the distributed application on the leader member was successful at expiration of the defined amount of time.

5. The computer-implemented method of claim 4 further comprising:

sending, by the first passive member, via the blockchain network, the notification message with a corresponding timestamp to the other members in the heterogeneous distributed computing environment indicating that the first passive member initiated a process to start a passive instance of the distributed application on the first passive member.

6. The computer-implemented method of claim 5 further comprising:

comparing, by the first passive member, via the blockchain network, respective timestamps corresponding to when each other respective passive member started its corresponding passive instance of the distributed application; and identifying, by the first passive member, via the blockchain network, a particular passive member in the set of passive members having an oldest timestamp associated with start of its corresponding passive instance of the distributed application based on comparison of the respective timestamps corresponding to each other respective passive member.

7. The computer-implemented method of claim 6 further comprising:

designating, by the first passive member, via the blockchain network, the particular passive member in the set of passive members having the oldest timestamp as the new leader member to continue starting its corresponding passive instance of the distributed application; and sending, by the first passive member, a notification message to remaining passive members in the set of passive members to stop starting corresponding passive instances of the distributed application.

8. The computer-implemented method of claim 1, wherein the heterogeneous distributed computing environment is a multi-cloud environment comprised of a plurality of clouds provided by different cloud providers, and wherein the distributed application is a distributed multi-cloud application that provides an online service corresponding to an entity to client device users via a network, and wherein the set of passive members is a set of passive clouds having passive instances of the distributed multi-cloud application in the multi-cloud environment, and wherein the leader member and the new leader member are leader clouds in the multi-cloud environment.

9. A computer system for distributed application orchestration management, the computer system comprising:

a bus system;

a storage device connected to the bus system, wherein the storage device stores program instructions; and a processor connected to the bus system, wherein the processor executes the program instructions to:

send, by a first passive member of a set of passive members, a notification message to other members in a heterogeneous distributed computing environment indicating that the first passive member is initiating start of a distributed application on the first passive member in response to the first passive member validating that a self-restart by a leader member failed;

compare, by the first passive member, timestamps associated with an attempt to start the distributed application by other passive members in the set of passive members;

stop, by the first passive member, a particular attempt to start the distributed application in response to the first passive member determining that a timestamp associated with the particular attempt to start the distributed application by the first passive member is newer than another timestamp of another passive member; and designate, by the first passive member, the other passive member having an older timestamp as a new leader member to continue starting the distributed application for failover.

10. The computer system of claim 9, wherein the processor further executes the program instructions to:

receive, by the first passive member, a notification message via a blockchain network indicating the self-restart of the distributed application by the new leader member is in progress.

11. The computer system of claim 10, wherein the processor further executes the program instructions to:

listen, by the first passive member, in the blockchain network to validate that the self-restart by the leader member failed in response to detecting a failure of the distributed application on the leader member by an application checking component running on the first passive member.

12. The computer system of claim 11, wherein the processor further executes the program instructions to:

wait, by the first passive member, a defined amount of time to allow the leader member to restart an instance of the distributed application on the leader member; and perform, by the first passive member, an application health check probe to validate whether to the restart of the instance of the distributed application on the leader member was successful at expiration of the defined amount of time.

13. The computer system of claim 12, wherein the processor further executes the program instructions to:

send, by the first passive member, via the blockchain network, the notification message with a corresponding timestamp to the other members in the heterogeneous distributed computing environment indicating that the first passive member initiated a process to start a passive instance of the distributed application on the first passive member.

14. The computer system of claim 13, wherein the processor further executes the program instructions to:

compare, by the first passive member, via the blockchain network, respective timestamps corresponding to when each other respective passive member started its corresponding passive instance of the distributed application; and identify, by the first passive member, via the blockchain network, a particular passive member in the set of passive members having an oldest timestamp associated with start of its corresponding passive instance of the distributed application based on comparison of the respective timestamps corresponding to each other respective passive member.

15. A computer program product for distributed application orchestration management, the computer program product comprising a computer-readable storage medium having program instructions embodied therewith, the program instructions executable by a processor to cause the processor to perform a method of:

sending, by a first passive member of a set of passive members, a notification message to other members in a heterogeneous distributed computing environment indicating that the first passive member is initiating start of a distributed application on the first passive member in response to the first passive member validating that a self-restart by a leader member failed;

comparing, by the first passive member, timestamps associated with an attempt to start the distributed application by other passive members in the set of passive members;

stopping, by the first passive member, a particular attempt to start the distributed application in response to the first passive member determining that a timestamp associated with the particular attempt to start the distributed application by the first passive member is newer than another timestamp of another passive member; and designating, by the first passive member, the other passive member having an older timestamp as a new leader member to continue starting the distributed application for failover.

16. The computer program product of claim 15 further comprising:

receiving, by the first passive member, a notification message via a blockchain network indicating the self-restart of the distributed application by the new leader member is in progress.

17. The computer program product of claim 16 further comprising:

listening, by the first passive member, in the blockchain network to validate that the self-restart by the leader member failed in response to detecting a failure of the distributed application on the leader member by an application checking component running on the first passive member.

18. The computer program product of claim 17 further comprising:

waiting, by the first passive member, a defined amount of time to allow the leader member to restart an instance of the distributed application on the leader member; and performing, by the first passive member, an application health check probe to validate whether to the restart of the instance of the distributed application on the leader member was successful at expiration of the defined amount of time.

19. The computer program product of claim 18 further comprising:

sending, by the first passive member, via the blockchain network, the notification message with a corresponding timestamp to the other members in the heterogeneous distributed computing environment indicating that the first passive member initiated a process to start a passive instance of the distributed application on the first passive member.

20. The computer program product of claim 19 further comprising:

comparing, by the first passive member, via the blockchain network, respective timestamps corresponding to when each other respective passive member started its corresponding passive instance of the distributed application; and identifying, by the first passive member, via the blockchain network, a particular passive member in the set of passive members having an oldest timestamp associated with start of its corresponding passive instance of the distributed application based on comparison of the respective timestamps corresponding to each other respective passive member.

\* \* \* \* \*